July 18, 1950      J. W. SAMZELIUS      2,516,021

SEALED SLEEVE BEARING

Filed June 8, 1946

WITNESSES:

INVENTOR
John W. Samzelius.
BY
ATTORNEY

UNITED STATES PATENT OFFICE 2,516,021

SEALED SLEEVE BEARING

John W. Samzelius, Pittsburgh, Pa., assignor to Westinghouse Electric Corporation, East Pittsburgh, Pa., a corporation of Pennsylvania Application June 8, 1946, Serial No. 675,472

5 Claims. (Cl. 308—36.1)

The present invention relates to sleeve-type bearings, and more particularly to a prelubricated, sealed, sleeve bearing.

The bearing of the present invention is a sealed, sleeve-type bearing, which is prelubricated with a sufficient supply of oil to last for a prolonged period of operation without addition of oil, and which is designed to be interchangeable with a prelubricated, sealed antifriction bearing of usual or conventional design. It is highly desirable to design the bearings of electric motors in such a way that either sleeve or antifriction bearings can be used interchangeably in the same bearing bracket. This reduces the number of parts which must be stocked by the motor manufacturer, with resultant economy, and also facilitates changing from one type of bearing to the other in the field.

In the present state of the art of oil-lubricated sleeve bearings, such bearings cannot be made interchangeable with ball or roller bearings if, by interchangeability, is meant that both bearings must have the same load-carrying capacity, as well as the same outside dimensions. In the case of bearings for electric motors, however, it is not necessary for both types of bearings to have the same load-carrying capacity. This is for the reason that the shafts of electric motors are of relatively large diameter, in order to be sufficiently rigid to maintain a uniform air gap in the motor, and the size of antifriction bearings for electric motors is, therefore, primarily determined by the shaft diameter, so that they usually have greater load-carrying capacity than is actually required.

If the load which is actually to be carried by the bearing is considered, it becomes possible to design a sleeve bearing which is interchangeable with an antifriction bearing, if interchangeability is defined to mean that both bearings have the same outside dimensions, and that both bearings have sufficient load-carrying capacity for the application in which they are to be used, even though the antifriction bearing may actually have greater maximum load-carrying capacity than the sleeve bearing. Sealed, prelubricated antifriction bearings are being used to an increasing extent, and there is a demand for prelubricated sleeve bearings which will require no more attention or maintenance than prelubricated antifriction bearings. A further requirement for interchangeability, therefore, is that the sealed sleeve bearing must be prelubricated with a sufficient supply of oil to provide adequate lubrication for a prolonged period of operation substantially equal to the expected life of a standard prelubricated antifriction bearing. With such interchangeability, the exterior dimensions and appearance of electric motors can be made the same for either type of bearing.

The principal object of the present invention is to provide a prelubricated, sealed sleeve bearing which will be interchangeable with a prelubricated, sealed antifriction bearing of usual design, in the sense that both bearings will be suitable for the same application and will have substantially equal life.

A further object of the invention is to provide a prelubricated, sealed sleeve bearing assembly of simple and inexpensive construction, which can be produced with a minimum of machining, and which utilizes a positive and effective means for supplying oil to the bearing.

A still further object of the invention is to provide a prelubricated, sealed sleeve bearing assembly in which the bearing is supported in a sealed cartridge member of simple and inexpensive construction, which provides space for a sufficient amount of oil to provide adequate lubrication for a prolonged period of operation comparable to the expected life of a standard prelubricated antifriction bearing.

Other objects and advantages of the invention will be apparent from the following detailed description, taken in connection with the accompanying drawing, in which.

Figure 3:
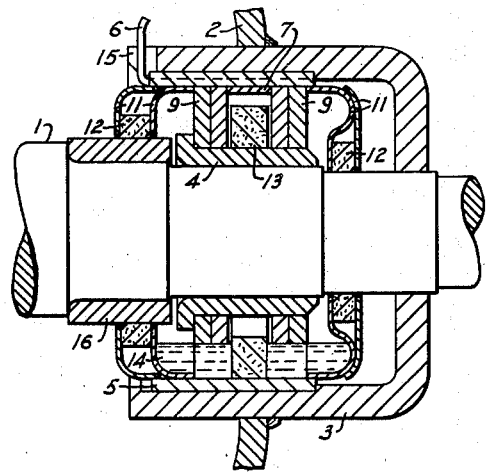
Fig. 3 is a longitudinal sectional view of a complete bearing assembly.

Referring first to Fig. 3, the invention is shown embodied in a sleeve bearing assembly for supporting a rotatable shaft 1. The bearing assembly is mounted in a stationary bearing support 2, which may, for example, be an end bracket of an electric motor, and which has not been shown in detail since it forms no part of the invention. The bearing support 2 may be of any suitable construction, and it includes a bearing housing 3, which has as internal bore in which the bearing assembly itself is received.

The bearing 4 shown in Fig. 3 is a sleeve bearing of the porous metal type, which may, for example, be made of powdered metal pressed to the desired shape and size and sintered to form a porous bearing. Such bearings are well known in themselves, and when impregnated with oil, they supply oil to the bearing surface by capillary action through the porous body of the bearing.

Figure 1:
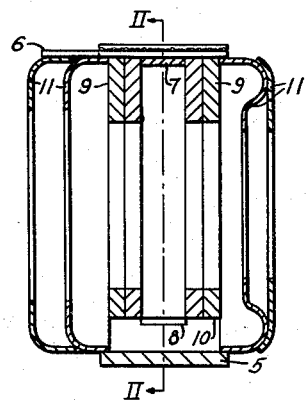
Figure 1 is a longitudinal sectional view of a bearing cartridge member.
Figure 2:
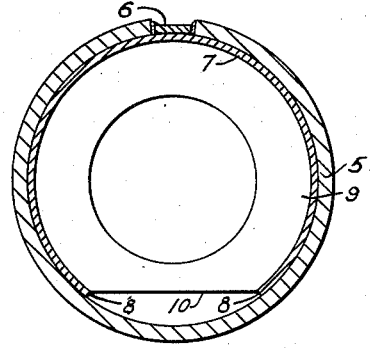
Fig. 2 is a transverse sectional view, approximately on the line II—II of Fig. 1.

The bearing 4 is supported in a sealed cartridge member, which is shown more clearly in Figs. 1 and 2. The cartridge includes an outer cylindrical member or ring member 5, which may be formed by bending a strip of sheet metal to the desired shape. The adjoining edges of the cylindrical member 5 are preferably spaced apart a small distance, as shown in Fig. 2, and a key member 6 is placed in the open space between them. The cartridge member also includes an inner ring member 7, which may also be formed from a sheet metal strip, and which is narrower than the outer cylindrical member 5. The ends 8 of the ring member 7 are spaced apart a considerable distance, as clearly shown in Fig. 2, so that the circumference of the ring member 7 is interrupted over a considerable distance. The ring member 7 is made of slightly larger outside diameter than the inside diameter of the cylindrical member 5, so that when the ring member 7 is inserted within the cylindrical member 5, it engages tightly against the inner surface of the cylindrical member. The ring member 7 is preferably positioned in the cylindrical member 5 with the interrupted portion of its circumference diametrically opposite the key member 6, as shown.

The bearing 4 is supported in the cartridge member by a plurality of annular members or washers 9. The annular members 9 fit snugly within the cylindrical member 5 on opposite sides of the ring member 7, and are pushed into the cylindrical member against the ring member 7, so that they form wall members within the cartridge and are spaced apart by the ring member 7. Any suitable number of annular members 9 may be used on each side of the ring member 7, so as to have sufficient total thickness to support the bearing 4 without too great a concentration of compressive stress in the bearing in the regions where it rests on the annular members. A single thick annular member might be used on each side of the ring member 7, but it is preferable to use two or more thin washers, as shown in Fig. 1, since such members can be produced very cheaply by stamping them from sheet metal, and the subsequent brazing of the complete cartridge bonds them solidly together with no additional cost. Each of the annular members 9 is cut off at one side, as indicated at 10, so that its periphery is spaced from the cylindrical member 5 at that side, and the annular members 9 are inserted in the cylindrical member so that the cut-away sides 10 coincide in position with the opening between the ends 8 of the ring member 7. In this way, a large oil chamber, or reservoir, is provided in the lower part of the cartridge member which is capable of containing a large supply of oil. The cartridge member is completed by placing sheet metal sealing members 11 in each end of the cylindrical member 5. The sealing members 11 may be of any suitable type which is adapted to hold felt sealing washers 12 in place.

After the cartridge member has been assembled in the manner described above, the parts are solidly brazed together in a furnace in a single operation, producing an integral unitary cartridge member in a simple and inexpensive manner. The only machining operations required to complete the cartridge member after brazing consist of reaming the bore of the annular members 9, and of grinding the outside of the cylindrical member 5 to accurately dimension it. The assembly of the bearing is completed by tucking an annular wick member 13 into the space between the annular members 9, and then pressing the bearing 4 into the bore of the annular members 9.

The bearing is prelubricated by soaking the assembly in oil, which saturates the wick 13, and fills the pores of the porous bearing 4 with oil. The oil chamber in the bottom of the cartridge member is also filled with oil 14, so that the bearing assembly contains a relatively large amount of oil which will supply adequate lubrication throughout a long period of operation. The bearing assembly is then ready to be inserted in position in the bearing housing 3 of the bearing support 2. The key member 6 is preferably bent up, as shown in Fig. 3, to engage in a notch 15 in the bearing housing 3 to insure proper positioning of the bearing assembly with the oil chamber at the bottom. The felt seals 12 are inserted in the sealing members 11 to engage the shaft 1, or a collar 16 pressed on the shaft, so as to seal the assembly against the escape of oil or the entrance of dust or dirt into the bearing.

In operation, oil is supplied to the porous bearing 4 by the wick 13, which extends down into the oil chamber. Since an annular wick 13 is used, the wick is in contact with the bearing over a relatively large part of its circumference, and thus very effective transfer of the oil from the oil chamber to the bearing is obtained. After passing through the bearing to the bearing surface, and through the bearing clearance between the bearing and the shaft, the oil escapes at the ends of the bearing, and drains, or is thrown, off the shaft, and returns to the oil chamber in the bottom of the cartridge member for reuse, the felt seals 12 preventing escape of the oil.

Figure 4:
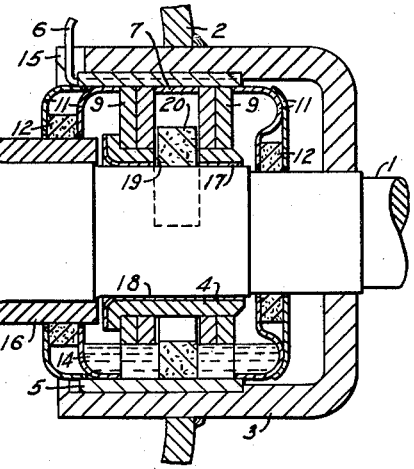
Fig. 4 is a view similar to Fig. 3, but showing the application of the invention to a different type of bearing.

Figure 4 shows the application of the invention to a non-porous type of sleeve bearing. The cartridge member shown in Fig. 4 is identical with that shown in Fig. 3, and described above. The bearing, however, consists of a steel bearing shell 17 with a lining 18 of babbitt, or other suitable bearing metal. A circumferential slot or window 19 is cut through the bearing in its upper side, and an annular wick member 20 is provided, which rests on the shaft 1 in the window 19. It will be seen that the assembly of Fig. 4 is substantially the same as that of Fig. 3, except that an annular wick 20 of somewhat smaller diameter is used which rests directly on the shaft. Since the wick 20 rests on the shaft, it may rotate slowly when the shaft is revolving, and thus the supply of oil from the oil chamber to the surface of the shaft is facilitated.

It should now be apparent that a sleeve bearing assembly has been provided which can be simply and easily produced at low cost. The cartridge member consists entirely of parts which may be readily formed from sheet metal, and which are brazed together into a complete assembly in one operation. A minimum of machining is required to complete the cartridge member, and a bearing assembly is thus provided which can readily be designed to be interchangeable with a standard antifriction bearing in the sense described above, that is, to have the same outside dimensions and to be suitable for the same application. The design of the cartridge is such that it is capable of containing a large amount of oil, so that the bearing is adequately lubricated throughout a relatively long period of operation without the addition of any more oil, and thus the life of the bearing can be made substantially equal to that of a sealed, prelubricated antifriction bearing with which it is to be interchangeable. Very effective lubrication is obtained by the use of an annular wick, which is in contact with the bearing, or the shaft, over a relatively large part of the circumference, so that very effective oil transfer from the oil chamber to the bearing surface is obtained.

A preferred embodiment of the invention has been shown and described for the purpose of illustration, but it is to be understood that the invention is capable of various modifications, and in its broadest aspects, therefore, it includes all equivalent embodiments and modifications which come within the scope of the appended claims.

I claim as my invention:

1. A sealed sleeve bearing assembly comprising an outer cylindrical member, a ring member disposed within said cylindrical member, said ring member engaging the inner surface of the cylindrical member, a plurality of annular members in the cylindrical member, said annular members being disposed on opposite sides of the ring member and spaced apart by the ring member, each of said annular members having a central opening and being spaced from the cylindrical member at one side to form an oil chamber between the annular members and the cylindrical member, a bearing supported in the openings of the annular members, a wick member encircling the bearing in the space between the annular members for conveying oil from the oil chamber to the bearing, and sealing means at the ends of the cylindrical member.

2. A sealed sleeve bearing assembly comprising an outer cylindrical member, a ring member disposed within said cylindrical member, said ring member engaging the inner surface of the cylindrical member and being interrupted over a portion of its circumference, a plurality of annular members in the cylindrical member, said annular members being disposed on opposite sides of the ring member and spaced apart by the ring member, each of said annular members having a central opening and being spaced from the cylindrical member at one side adjacent the interrupted portion of the ring member to form an oil chamber between the annular members and the cylindrical member, a bearing supported in the openings of the annular members, a wick member encircling the bearing in the space between the annular members for conveying oil from the oil chamber to the bearing, and sealing means at the ends of the cylindrical member.

3. A sealed sleeve bearing assembly comprising an outer cylindrical member, a ring member disposed within said cylindrical member, said ring member engaging the inner surface of the cylindrical member and being interrupted over a portion of its circumference, a plurality of annular members in the cylindrical member, said annular members being disposed on opposite sides of the ring member and spaced apart by the ring member, each of said annular members being generally circular and having a central opening, each of said annular members having a flattened side adjacent the interrupted portion of the ring member to form an oil chamber between the annular members and the cylindrical member, a bearing supported in the openings of the annular members, a wick member encircling the bearing in the space between the annular members for conveying oil from the oil chamber to the bearing, and sealing means at the ends of the cylindrical member.

4. A cartridge member for a sleeve bearing assembly, said cartridge member comprising an outer cylindrical member, a ring member disposed within said cylindrical member, said ring member engaging the inner surface of the cylindrical member, a plurality of annular members in the cylindrical member, said annular members being disposed on opposite sides of the ring member and spaced apart by the ring member, each of said annular members having a central opening and being spaced from the cylindrical member at one side to form an oil chamber between the annular members and the cylindrical member, and sealing means at the ends of the cylindrical member.

5. A cartridge member for a sleeve bearing assembly, said cartridge member comprising an outer cylindrical member, a ring member disposed within said cylindrical member, said ring member engaging the inner surface of the cylindrical member, and being interrupted over a portion of its circumference, a plurality of annular members in the cylindrical member, said annular members being disposed on opposite sides of the ring member and spaced apart by the ring member, each of said annular members being generally circular and having a central opening, each of said annular members having a flattened side adjacent the interrupted portion of the ring member to form an oil chamber between the annular members and the cylindrical member, and sealing means at the ends of the cylindrical member.

JOHN W. SAMZELIUS.

REFERENCES CITED

The following references are of record in the file of this patent:

UNITED STATES PATENTS

| Number | Name | Date |
|---|---|---|
| 191,901 | Tomlinson | June 12, 1877 |
| 765,936 | Ray | July 26, 1904 |
| 1,561,076 | Heitman et al. | Nov. 10, 1925 |
| 1,989,619 | Ledeen | Jan. 29, 1935 |
| 2,035,519 | Apple | Mar. 31, 1936 |
| 2,230,472 | Sullivan | Feb. 4, 1941 |
| 2,318,477 | Firth | May 4, 1943 |